(12) United States Patent
Fahmy et al.

(10) Patent No.: US 7,142,715 B2
(45) Date of Patent: Nov. 28, 2006

(54) ARABIC HANDWRITING RECOGNITION USING FEATURE MATCHING

(75) Inventors: Hesham Osman Mahmoud Fahmy, Nasr (EG); Samah Mohamed Elrayan, Cairo (EG)

(73) Assignee: Sakhr Software Company, Cairo (EG)

( * ) Notice: Subject to any disclaimer, the term of this patent is extended or adjusted under 35 U.S.C. 154(b) by 743 days.

(21) Appl. No.: 10/346,486

(22) Filed: Jan. 17, 2003

(65) Prior Publication Data

US 2004/0141646 A1    Jul. 22, 2004

(51) Int. Cl.
  *G06K 9/00*    (2006.01)
(52) U.S. Cl. .................................................. 382/187
(58) Field of Classification Search ............... None
  See application file for complete search history.

(56) References Cited

FOREIGN PATENT DOCUMENTS

JP      2001-256437    *  9/2001

OTHER PUBLICATIONS

"Off-Line Arabic Character Recognition" by Goraine et al.,vol. 25, Issue 7, Jul. 1992 pp. 71-74 Digital Object Identifier 10.1109/2.144444.*

"A Handwritten Arabic Character Recognition Technique for Machine Reader" by El-desouky et al.,Software Engineering for Real Time Systems, 1991., Third International Conference on Sep. 16-18, 1991 pp. 212-216.*

"On-line recognition of handwritten Arabic characters using A Kohonen neural network" by Mezghani et al., Frontiers in Handwriting Recognition, 2002. Proceedings. Eighth International Workshop on Aug. 6-8, 2002 pp. 490-495 Digital Object Identifier 10.1109/IWFHR.2002.1030958.*

"Real-time Arabic Handwritten Character Recognition" by El-Sheikh et al., Image Processing and its Applications, 1989., Third International Conference on Jul. 18-20, 1989 pp. 212-216.*

* cited by examiner

*Primary Examiner*—Jingge Wu
*Assistant Examiner*—Charles Kim
(74) *Attorney, Agent, or Firm*—Jones Day

(57) ABSTRACT

An Arabic handwriting recognition system takes an input from a stylus in the form of an ordered sequence of data. The sequence of data is then processed to eliminate any noise associated with data, and subsequently strokes (or directed line segments) are extracted from the sequence of data. More analysis of the strokes is performed to transform the input data into a features vector. Next, the features vector is matched against the features of all Arabic letters using fuzzy matching and dynamic programming techniques. During this matching process, the input word is segmented into the sequence of characters that maximized the matching score. In addition, external objects (such as: single dots, double dots, triple dots, hamzas, or maddas) that are above and below Arabic letters are detected.

15 Claims, 19 Drawing Sheets

| | |
|---|---|
|  | Arabic word with "ONE DOT" |
|  | Arabic word with "DOUBLE DOTS" |
|  | Arabic word with "THREE DOTS" |
|  | Arabic word with "HAMZA" |
|  | Arabic word with "MADDA" |

| | |
|---|---|
|  | Word with zero external object |
|  | Word with one external object |
|  | Word with three external objects |

 
Figure 10c     Figure 10d

ARABIC HANDWRITING RECOGNITION USING FEATURE MATCHING

FIELD OF INVENTION

The present invention relates generally to the field of handwriting recognition. More specifically, the present invention is related to recognizing Arabic online handwriting using feature matching.

BACKGROUND

User interfaces to computer applications have evolved over a period of years from text-based interfaces to graphical interfaces. It is further expected that interfaces will evolve beyond the graphical user interface (GUI) of the 1990s to a more natural user interface in the decades ahead. International Data Corporation® (IDC) gives a name to this new interface, the natural user interface (NUI).

The primary object of the NUI is to broaden the use of speech and natural language capabilities in human interaction with computers. Therefore, the two key requirements of NUI include the ability of application software to accommodate conversational dialogs between system and user, and the incorporation of a common sense knowledge base to enhance the system's ability to properly interpret the meaning of the user's conversation.

Present day computer users are familiar with manipulating computer applications via user graphical interfaces, which in turn can be manipulated via a mouse and a keyboard. While the color, modeless GUI was a great improvement over its predecessors; the ability to operate such interfaces is not natural (but on the contrary, an acquired ability). However, a human learns the art of pointing at an object on the screen and clicking a mouse button with relative ease, as opposed to the complexity involved in having to type a set of cryptic commands. Touch screens are in the same category. There are more natural ways for us to communicate, however, especially when keypads become too small for serious typing, as in the case of portable computer-based devices such as personal digital assistants (PDAs).

As stated earlier, IDC expects the user interface of the next decade to be much more natural. This new interface will contain one or more natural language understanding, speech recognition and speech synthesis, and handwriting recognition. Although the user interface language was an issue in developing GUI-based applications, the language impact on the new natural interfaces will be much greater and much more sophisticated. Of all the features proposed by the IDC for the natural language interface, the handwriting recognition aspect finds the greatest applicability in the area of PDAs and other hand-held computer-based devices, since upon successful implementation, users are be able to write down information (which in turn is identified via a handwriting recognition algorithm) on the screen of the PDA instead of typing in the information using a small virtual keyboard.

Handwriting recognition is the technique by which a computer system can recognize characters and other symbols written by hand. In theory, handwriting recognition should free us from our keyboards, allowing us to write and draw in a more natural way. It is considered one of the key technologies that will determine the ultimate success or failure of PDAs and other hand-held devices. To date, however, the technology has had only limited success. This is partly because it is still a new technology and is not as fast or accurate as it needs to be.

Although prior art applications have implemented, with minimal success, handwriting recognition algorithms for languages such as English, they have yet to overcome the complex linguistic challenges posed by other languages such as Arabic. One reason why Arabic poses problems in the area of handwriting recognition is the fact that there are a myriad of externals (including diacritics) associated with the Arabic language, thereby making it complicated for algorithms to discern the exact written content. Thus, there is a need for an Arabic handwriting recognition system. More specifically, there is a need for an Arabic handwriting recognition system, with a natural user interface, that takes into accounts the complex nature of the Arabic language.

SUMMARY OF THE INVENTION

The present invention provides for a system and a method for recognizing Arabic handwriting using features matching. The Arabic handwriting recognition system of the present invention takes an input from a stylus (or an electronic pen) in the form of an ordered sequence of data, along with some additional information such as pen pressure, and the direction of movement of the pen. Next, the system processes the sequence of data to eliminate any noise associated with data, and subsequently extracts strokes (or directed line segments) from the sequence of data. More analysis of the strokes is performed to transform the input data into a features vector.

Furthermore, the system and method match the features vector against the features of all Arabic letters using fuzzy matching, dynamic programming techniques, and a set of linguistic rules. During this matching process, the input word is segmented into the sequence of characters that maximizes the matching score. In addition, the system of the present invention is adapted to handle and recognize external objects (such as: single dots, double dots, triple dots, hamzas, or maddas) that are above and below Arabic letters. Moreover, the system is also adaptable to recognize a myriad of writing styles in order to give more accuracy for specific writers. Additional embodiments of the present invention include the utilization of a speller, dictionary, and linguistic rules to eliminate many possibilities of Arabic letters.

BRIEF DESCRIPTION OF THE DRAWINGS

FIG. 3c illustrates an Arabic word composed of two Pieces of Arabic Words (PAWs).

FIG. 3d illustrates an Arabic word composed of five PAWs.

FIGS. 10a–d collectively illustrate how the algorithm of the present invention handles externals.

FIG. 13a illustrates an example of Arabic characters.

DESCRIPTION OF THE PREFERRED EMBODIMENTS

Figure 1:
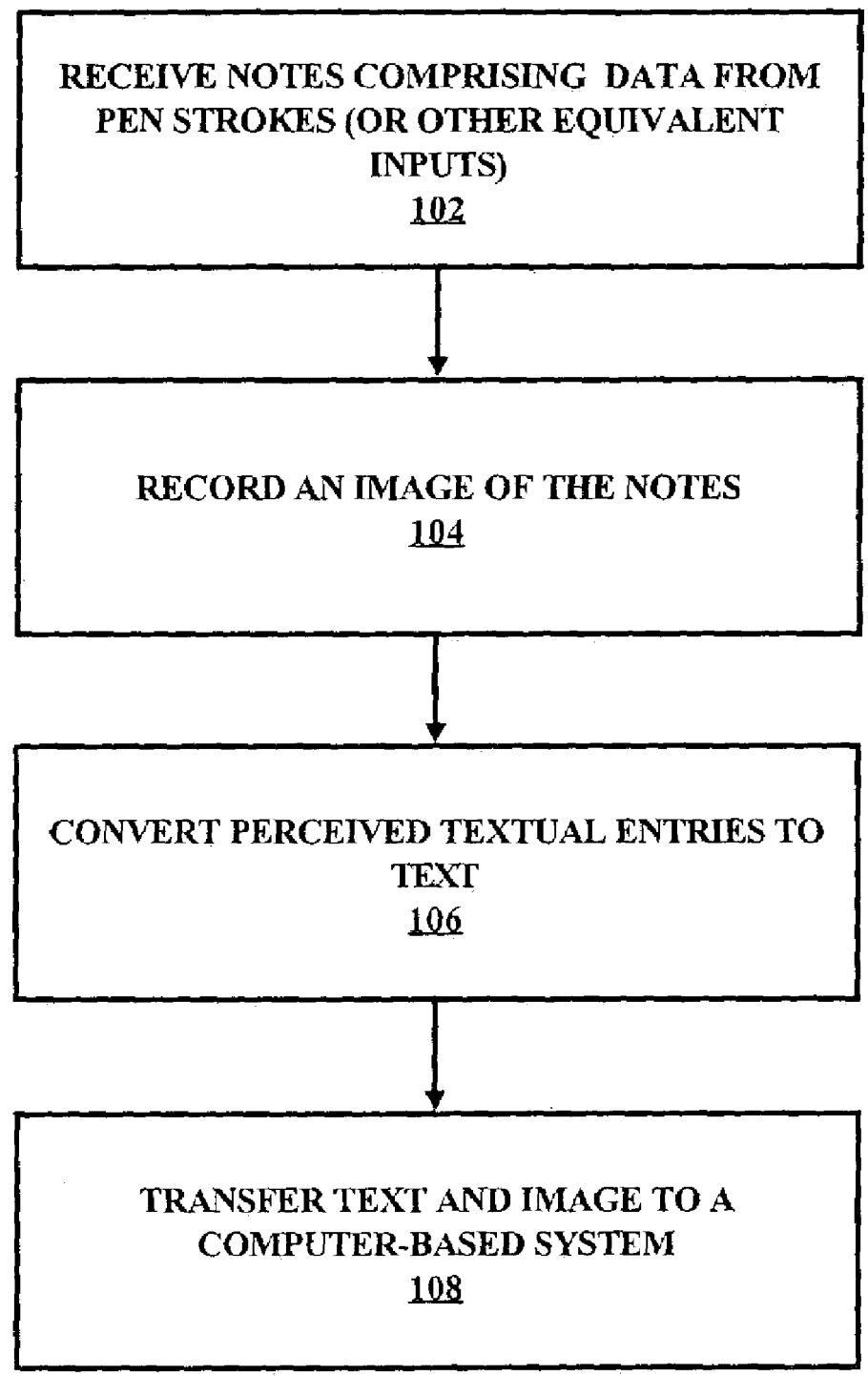
FIG. 1 illustrates a general method associated with the handwriting recognition of text entered in a hand-held computer-based device via a pen.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention. For example, the present invention is described on a PDA, but is equally useful on other computer-based devices (e.g., laptop, PC, etc.).

When users acquire a PDA for the first time they have to learn to enter textual information by touch-typing on the screen of the PDA. Although the touch-typing aspect is useful, it is more beneficial to have a system that recognizes handwritten entries on the screen of the PDA. One advantage of such a system, implementing handwriting recognition algorithms (as in a NUI) in PDA's, is the user's inherent comfort level with writing as opposed to touch-typing.

The NUI interacts with the computer application using, for example, an electronic pen (also called stylus) and tablet or pointer and touch screen. Hence, a beneficial aspect of the NUI will be the ability to recognize handwriting on PDAs, mobile phones, and other computer-based handheld appliances. While users are taking regular written notes, the pen is transmitting their pen strokes, recording the image of their notes, and converting text entries into text. Both the image and text are, in some embodiments, later transferred to a desktop system.

FIG. 1 illustrates a general method associated with the handwriting recognition of text entered in a hand-held computer-based device via a pen. First, an input from pen strokes of an electronic pen or stylus is acquired (step 102). Next, an image of the notes is also recorded (step 104). Lastly, based on the input and the image, any identifiable text is extracted (step 106), and the text and image are transferred to a computer system (step 108). It should be noted that although an input in this example is described as the input from a pen or stylus, one skilled in the art could envision various other possibilities of input, such as electronically scanned entries from a paper form, without departing from the scope of the invention.

Figure 2:
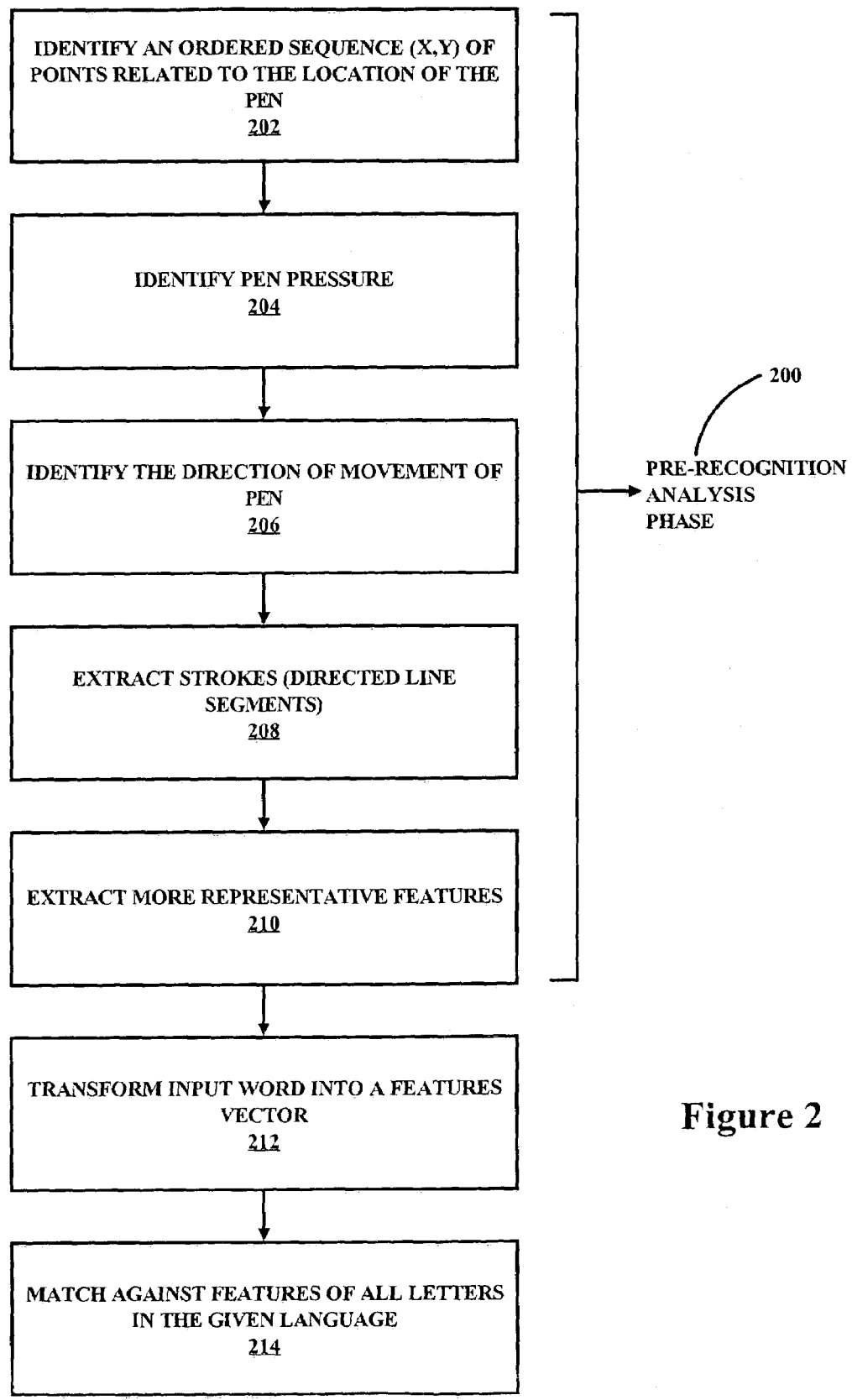
FIG. 2 illustrates the preferred embodiment of the method for recognizing Arabic handwriting using features matching.
Figure 3A:
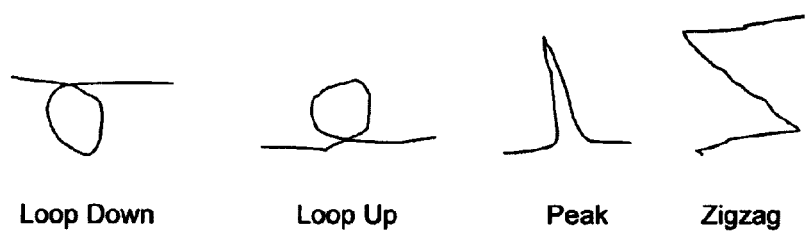
FIG. 3a illustrates examples of the loops, peaks, and zigzags.

The present invention's method extends the method described in FIG. 1 to encompass the special features of the Arabic language. FIG. 2 illustrates the preferred embodiment of the method for recognizing Arabic handwriting using features matching. In the pre-recognition analysis phase (200), the Arabic handwritten recognition engine of the present invention takes an ordered sequence of x and y points along with some additional information such as pen pressure (204), and the direction of movement of the pen (206). Pen pressure indicates changes that happen in pen moving directions. This information helps in the detection of sharp turnover points in the input skeleton. This sequence (x,y) represents the path of movement of the pen while writing the input text. Next, the method processes this sequence of points by extracting strokes (directed line segments) (208) and eliminating noisy and insignificant segments. Next, more analysis is made to extract more representative features (210) such as up-loops, down-loops, peaks, and zigzag. After these pre-recognition analysis phases (200) are done, the input word is transformed into a features vector (212). This input vector is matched against the features of all Arabic letters (214) using advanced fuzzy matching and dynamic programming techniques. During the matching process, the input word is segmented into the sequence of characters that maximizes the matching score. Examples of the above mentioned loops, peaks, and zigzags are illustrated in FIG. 3a.

Figure 3B:
FIG. 3b illustrates examples of small objects used in Arabic words.
Figure 3B:
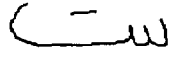
Figure 3B:
Figure 3B:
Figure 3B:

Handling the small objects above and below Arabic letters (external objects) is one of the biggest challenges Arabic online handwriting recognition faces. These objects are used in many of the Arabic letters. These external objects could be one, a double, or triple dots, hamza, or madda. Examples of these objects in use in Arabic words are shown in FIG. 3b.

Not only is recognizing these small objects a challenge, but so is attaching them to different letters. This might lead to a huge number of possible combinations for the result.

Because of the above difficulties, the handwriting recognition engine of the present invention generates a list of candidate results and then uses speller, dictionary, and linguistic rules to eliminate as many of possibilities based on sophisticated scoring techniques, leaving the most possible result. In a typical scoring technique, the input word is divided into number of connected pieces. Each piece may be either a single "isolated" character or a set of connected characters. The handwriting recognition engine uses a large number of pre-learned samples for each character to recognize each word piece first as an isolated character. If this step is successful, then the step is tried as multiple characters. Priority is usually given to an isolated character if it matches with one of the pre-learned samples. For connected characters, first the start and end characters are recognized up to the first event point and staring from the last event point respectively. Then other middle characters are recognized using the other events as separators. The final scoring depends on language writing-specific rules that prevent some specific character sequences, and further on some statistical rules for how frequently specific Arabic characters adjacent to each other. Furthermore, the engine is flexible enough to learn more writing styles in order to give more accuracy for specific writers. Prior to introducing a detailed description of the algorithm used for the implementation of the present invention's method as described in FIG. 2, a list of terms used in the description, and their definitions are provided for to benefit the reader.

It should be noted that the definitions provided below are to help with a general understanding of Arabic handwriting recognition and are not meant to limit their interpretation or use thereof. Other known definitions or equivalents may be substituted without departing the scope of the present invention.

Piece of Arabic Word (PAW): An Arabic word is composed of a number of PAWs, wherein each PAW is a connected segment of writing. For example, the Arabic word shown in FIG. 3c includes two PAWs, while the Arabic word shown in FIG. 3d is includes five PAWs.

PAW Points: PAW points are a list of points that constitute one PAW.

PAW Strokes: PAW strokes are a list of strokes that constitute one PAW.

Dynamic Programming: Dynamic programming is a computer technique that is used to recognize single characters, including their start or end with externals. Thus, after the Arabic handwriting recognition engine of the present invention provides all possible candidates for each case, dynamic programming is simply a comparison of the candidates to get the nearest match. Shifts in input words strokes with respect to the stored samples do not affect the performance of the dynamic programming technique.

Slashers: Slashers are rules used to exclude any illogical combinations of letters. These are based on a language model.

Figure 4A:
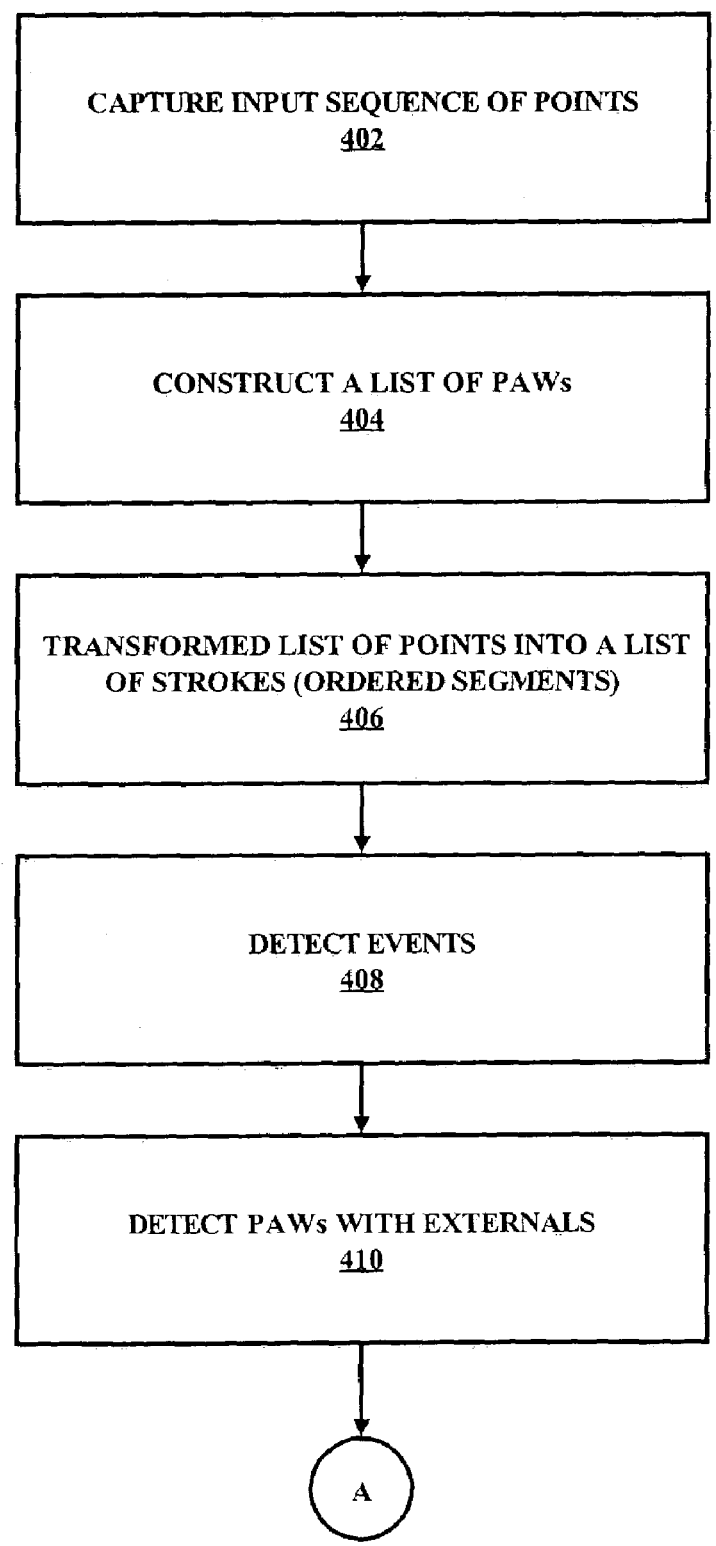
FIGS. 4a–b collectively illustrate the algorithm of the present invention's method for recognizing online Arabic handwriting based on matching features.
Figure 4B:
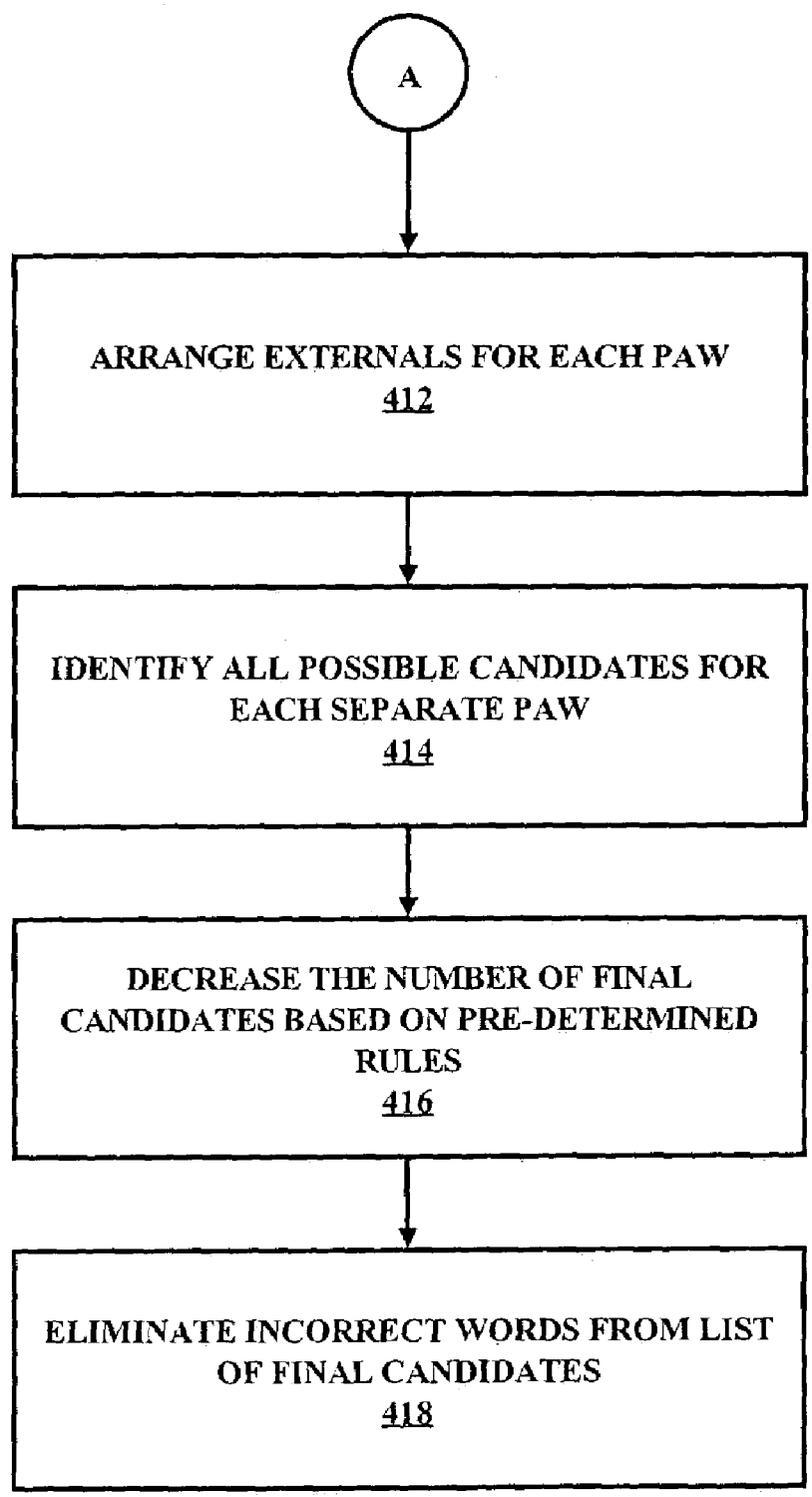

FIGS. 4a and 4b collectively illustrate the algorithm of the present invention's method for recognizing online Arabic handwriting based on matching features. First, the input sequence of points is captured (402) and used to construct a list of PAWs (404). Next, each PAW is represented by an ordered list of points (this eliminates any noise due to the vibration of the pen are removed). Subsequently, the PAW's list of points are transformed into a list of strokes (ordered segments) (406), then the strokes are smoothed in a pass for noise removal. Next, events such as loops up, loops down, peaks, Feh Maftoha and zigzags, are detected by parsing each PAW's strokes (408). Then, PAWs strokes are ordered by their x positions and writing order, to remove any limitations of writing the PAW followed by its externals. The algorithm then detects all PAWs representing externals (410). Externals include, but are not limited to, dot, double dot, triple dot, hamza, madda, alef, kaaf sharta. After detecting externals, the algorithm arranges all externals for each PAW (412). After this step, the algorithm guarantees that each PAW is immediately followed by any of its appropriate externals. As the next step, the algorithm identifies all possible candidates for each separate PAW (414). In the final phase, the algorithm makes a Cartesian product between candidates of each PAW, taking into consideration some rules in order to decrease the final number of candidates (416). The list of candidates is then passed to the dictionary to exclude incorrect words (418). A step-by-step, detailed account of the recognition algorithm is detailed below.

Figure 5A:
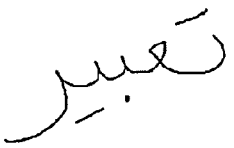
FIG. 5a illustrates examples of Arabic words with varying numbers of external objects.
Figure 5A:
Figure 5A:
Figure 5B:
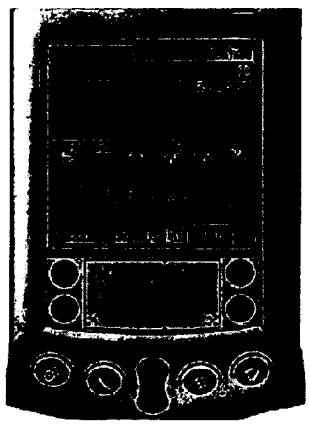
FIG. 5b illustrates how Arabic words appear on a PDA.

An Arabic word can have zero, one, or more external objects. FIG. 5a shows examples of Arabic words with varying numbers of external objects. Displayed on a PDA, Arabic words appear as shown in FIG. 5b.

Figure 6A:
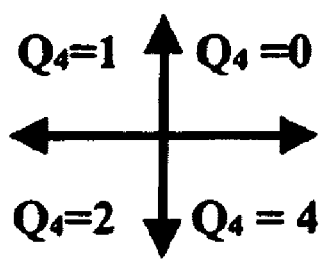
FIG. 6a illustrates an example of the Q4 coordinate system.
Figure 6B:
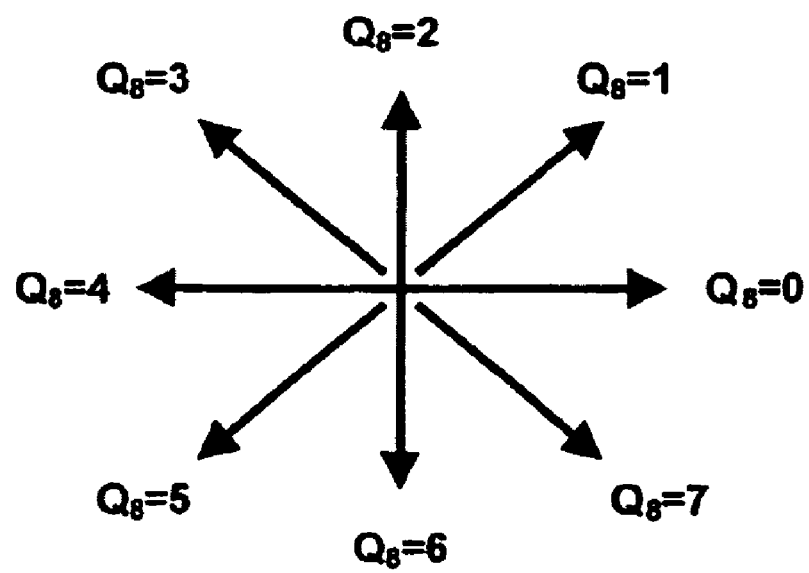
FIG. 6b illustrates an example of the Q8 coordinate system.
Figure 7:
FIG. 7 illustrates an example of how a point's direction is measured from the previous point to the current point.

A. Preparation Steps:

The input is taken from any pointing device as a sequence of (x,y) points. This sequence of points may also include a pressure parameter P. The pressure parameter may be generated from conventional force detection systems (e.g., mechanical spring, piezo electric sensor, magnetic sensor, etc.) either in the pen or on the writing surface. A list of PAWs is then created from this list after eliminating noisy PAWs that might result from pen vibration. It should be noted that during this step, repeated points and very adjacent points are ignored. Next, each point is assigned a direction flag based on three direction mapping systems:

Q4, Q8 and Q12 coordinate mapping systems divide 360° into 4, 8, or 12 divisions respectively. As an example, the Q4 and Q8 coordinate systems are illustrated in FIGS. 6a and 6b, respectively. The point's direction is measured from the previous point to the current point, as shown in FIG. 7.

Figure 8A:
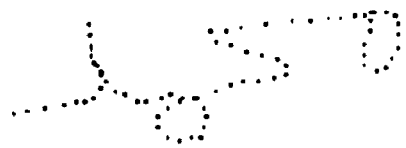
FIG. 8a illustrates an Arabic word represented by points.

Then, each point in the input sequence is tested to determine whether the point is an inflection point or not. The pressure parameter may be used to detect a change in direction (e.g., pressure changes when direction changes). This is determined based on the angle between this point and the previous one. An example of an Arabic word represented by points is illustrated in FIG. 8a.

B. Smoothing

Figure 8B:
FIG. 8b illustrates an Arabic word after smoothing.

In this phase PAWs are converted into strokes. Stroke is defined as a line between two special points (such as inflection points). However, it should noted that not all inflection points construct strokes during the smoothing process, but only the ones wherein the distance between the point and the previous inflection point is greater than a specific threshold. FIG. 8b is an example of an Arabic word after smoothing.

C. Event Detection

In this phase, following events are defined:

1. Loops are defined based on intersection between strokes. Furthermore, certain loops are ignored based on their width and height. A loop is classified as an up-loop or down-loop according to whether the number of intersections between the loop and the upward centroid are even or odd.
2. Peaks and Feh Angle: up then down movements are detected, if the x direction goes to left then it's a peak and if it's to right then it's Feh angle.
3. Zigzag: detecting any left-right movement, then right-left movement, generates a zigzag.

Figure 8C:
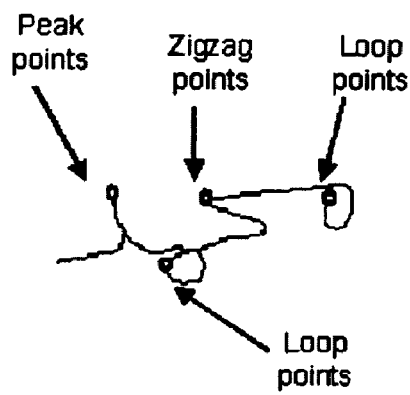
FIG. 8c illustrates important points extracted from an input Arabic word.

An example of important points extracted from an input Arabic word are shown in FIG. 8c.

D. Repeat Smoothing

In this step, strokes generated so far are revisited in terms of Q12 direction. Furthermore, consecutive strokes having the same Q12 direction are merged.

Figure 9:
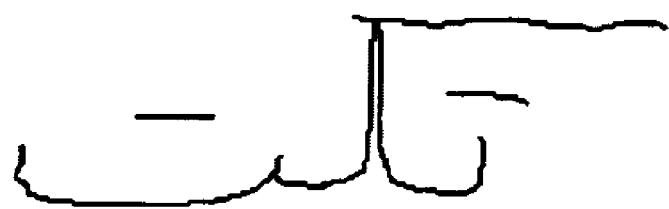
FIG. 9 illustrates special cases that fail the process of ordering segments from right to left.

E. PAW Ordering:

In this step, PAWs are ordered so that user is not restricted to a specific order in writing externals. This takes place in two passes:

1. Arranging all segments based on the most right point of each segment. This orders segment from right to left. However, as illustrated in FIG. 9, some special cases might fail in this process.
2. Based on the assumption that write will not start with an external before the main part, in the above case the writing order is taken into consideration.

F. Positioning Externals

Figure 10A:
Figure 10B:

The recognition engine identifies the external as up or down depending on its coordinates and location with respect to a main character. For example:

1. For a single dot, as shown in FIG. 10a, a vertical line is taken from this point. If it cuts the main, then a decision is made based upon the y-value of the intersection point.
2. A check is performed, as shown in FIG. 10b, to see if the top left and right bottom corners of external are both above, and if they are above, the external is detected as being above. The vice versa is also true for a check for an external that is below.

3. In the instance that one end is up and the other is down, as shown in FIGS. 10c and 10d, then the external is up. It should be noted that based on this rule, the following cases will fail: Alef will be detected as below in first case, and dots will be detected as up in second case.

Figure 11A:
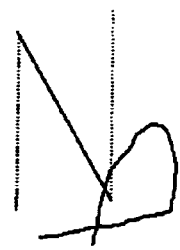
FIGS. 11a–b collectively illustrate the special case wherein an external's position is recalculated.
Figure 11B:
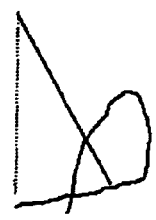

4. If any point is outside the main, as shown in FIGS. 11a and 11b, it will be moved to x position of the other point and the position is recalculated.

Figure 12:
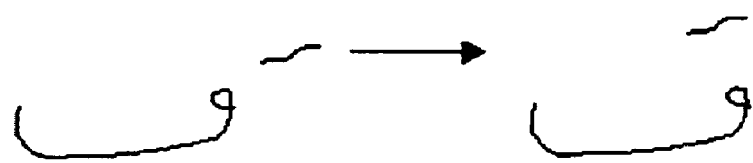
FIG. 12 illustrates the scenario in which both ends of the external are outside.

5. In the instance that both ends are outside (this case may happen if a user writes external to the right of the main), as shown in FIG. 12, they are moved to the x position of the start of the main.

G. Ordering Externals for Each Main:

In this phase, the PAWs are arranged such that each main is followed by all its external. Though, external objects themselves are not ordered. For this purpose, we arrange externals according to their x-coordinate. But in the case of partial overlapping between two externals, the writing order is used as ordering criteria. If there is full overlapping, the smaller external is first, if it lies to the right rather than the left. There is a special case here, if the external is Kaf shartah (long dot), then the other external that overlaps it is first, and the Kaf Shartah is the last.

H. Recognizing PAW Candidates:

For each main PAW, the system of the present invention first tries to know whether it can be isolated or not. The PAW can be isolated if its number of strokes is at most "MAX_S", and the number of events is at most "MAX_E".

H.1 Recognizing Character:

In addition to spotting characters as a sequence of events, many heuristic rules are used to recognize characters (especially in isolated case). During learning, characters are mapped to a sequence of events. And in recognition, the detected sequence of events is scanned and divided into a sequence of characters that best matches the input events sequence.

H.2 Assigning Externals:

Assigning externals to possible events is a complex operation, as errors in assigning one external may propagate to other characters and externals. And if extra assignments happen, the number of candidates will grow dramatically. Therefore, the system of the present invention first assigns single dots (up or down), where the dot is assigned to the two events containing it. Second, it assigns all the other externals. An external is assigned to events if it overlaps it, or if it starts before the next event. Special handling is made if the external is a long dot (may be Kaf Sharta), in which case, the minimum distance between it and all peaks are measured, and subsequently it is assigned to the peak with minimum distance. If there is any unassigned external, it's distributed on start event and end event.

Figure 13B:
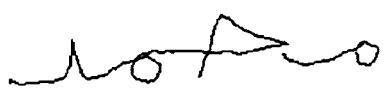
FIGS. 13b–c collectively illustrate the problem of disconnectivity resulting from writing styles of some Arabic characters.
Figure 13C:
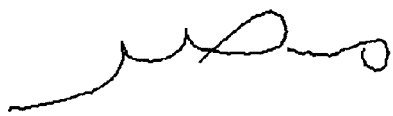

H.3 Allowing Disconnection:

An intelligent post processing is applied to overcome the problem of disconnectivity resulting from the writing style of some characters like those illustrated in FIG. 13a, as shown in FIGS. 13b and 13c. It has been noticed that a faked Reh always comes at the end of the first PAW. So as a post-processing step, if a PAW ends with Reh and the next starts with one of the disconnected characters, a check is performed on the vertical distance between the Reh end and the next character. If the distance is less than a given value, the Reh is deleted and the characters are connected together.

H.4 Filtering the Incorrect Words

Lastly, the candidates list is passed through a Multi-Mode Morphological Processor (MMMP) engine, to exclude incorrect words with respect to the Arabic language. This is an optional feature in the recognition engine. MMMP is a morphological analyzer synthesizer for Arabic and it covers a whole range of Arabic words: modern, classic, or even archaic. For each input word and its root, the analyzer provides for:

1. morphological pattern,
2. article and prepositional prefixes and inflectional requirements,
3. pronominal and case ending suffixes, and
4. derivational and inflectional requirements.

Through the implementation of the above-referenced steps, the present invention's handwriting recognition system implements a natural user interface that takes into account the complex nature of the Arabic language, and provides for a robust handwriting recognition system based on feature matching. The above described system and method for recognizing Arabic using feature matching are implemented in various computing environments. For example, the present invention may be implemented on a conventional IBM PC or equivalent, multi-nodal system (e.g. LAN) or networking system (e.g. Internet, WWW, wireless web). All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of handwriting recognition.

A system and method has been shown in the above embodiments for the effective implementation of an Arabic online handwriting system that utilizes features matching. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or specific computing hardware.

We claim:

1. A system for automatically recognizing Arabic handwriting based on feature matching, wherein said system receives handwriting input from an input device, said system comprising:
   a stroke extractor extracting strokes from said received handwriting input;
   a feature extractor extracting representative features from said extracted strokes;
   a vector transformer transforming said extracted representative features into a features vector;
   a matcher matching said features vector against a list of Arabic letters and externals, and extracting any Arabic letters and externals that match said features vector, and
   an external organizer placing any said matched externals right after any corresponding matched Arabic letters.

2. A system for automatically recognizing Arabic handwriting based on feature matching, wherein said system receives handwriting input from an input device, as per claim 1, wherein said input device is any of the following: pen-based tablet, electronic stylus, or a touch screen.

3. A system for automatically recognizing Arabic handwriting based on feature matching, wherein said system receives handwriting input from an input device, as per claim 1, wherein said feature extractor further comprises a noise removal mechanism to remove noise from said received handwriting input.

4. A system for automatically recognizing Arabic handwriting based on feature matching, wherein said system receives handwriting input from an input device, as per claim 1, wherein said representative features include any of the following: loop-up, loop-down, peaks, feh maftoha, and zigzags.

5. A system for automatically recognizing Arabic handwriting based on feature matching, wherein said system receives handwriting input from an input device, as per claim 1, wherein said externals include any of the following: dot, double dot, triple dot, hazma, madda, alef, and kaaf sharta.

6. A system for automatically recognizing Arabic handwriting based on feature matching, wherein said system receives handwriting input from an input device, as per claim 1, wherein said matcher utilizes fuzzy matching and dynamic programming techniques to match said features vector against said list of Arabic letters and externals.

7. A system for automatically recognizing Arabic handwriting based on feature matching, wherein said system receives handwriting input from an input device, as per claim 1, wherein said system further uses any of: a speller, dictionary, or linguistic rules to match said features vector against said list of Arabic letters and externals.

8. A method for automatically recognizing Arabic handwriting based on feature matching, wherein handwriting input is received from an input device, said method comprising:
   extracting strokes from said received handwriting input;
   extracting representative features from said extracted strokes;
   transforming said extracted representative features into a features vector;
   matching said features vector with Arabic letters and externals and extracting any Arabic letters or externals that match said features vector, and placing any of said matched externals after any corresponding Arabic letters.

9. A method for automatically recognizing Arabic handwriting based on feature matching, wherein handwriting input is received from an input device, as per claim 8, wherein said input device is any of the following: pen-based tablet, electronic stylus, or touch screen.

10. A method for automatically recognizing Arabic handwriting based on feature matching, wherein handwriting input is received from an input device, as per claim 8, wherein said step of extracting features further comprises a noise removal step to remove noise from said received handwriting input.

11. A method for automatically recognizing Arabic handwriting based on feature matching, handwriting input is received from an input device, as per claim 8, wherein said representative features include any of the following: loop-up, loop-down, peaks, feh maftoha, and zigzags.

12. A method for automatically recognizing Arabic handwriting based on feature matching, handwriting input is received from an input device, as per claim 8, wherein said externals include any of the following: dot, double dot, triple dot, hazma, madda, alef, and kaaf sharta.

13. A method for automatically recognizing Arabic handwriting based on feature matching, handwriting input is received from an input device, as per claim 8, wherein said matching step further comprises the utilization of fuzzy matching and dynamic programming techniques to match said features vector against said list of Arabic letters and externals.

14. A method for automatically recognizing Arabic handwriting based on feature matching, handwriting input is received from an input device, as per claim 8, wherein said method further uses any of: a speller, dictionary, or linguistic rules to match said features vector against said list of Arabic letters and externals.

15. An article of manufacture comprising a computer readable medium having computer readable code embodied therein which automatically recognizes Arabic handwriting based on feature matching, comprising:
   computer readable program code extracting strokes from received handwriting input;
   computer readable program code extracting representative features from said extracted strokes;
   computer readable program code transforming said extracted representative features into a features vector;
   computer readable program code matching said features vector with Arabic letters and externals and extracting any Arabic letters or externals that match said features vector, and
   computer readable program code placing any of said matched externals after any corresponding matched Arabic letters.

* * * * *